United States Patent Office 2,787,449
Patented Apr. 2, 1957

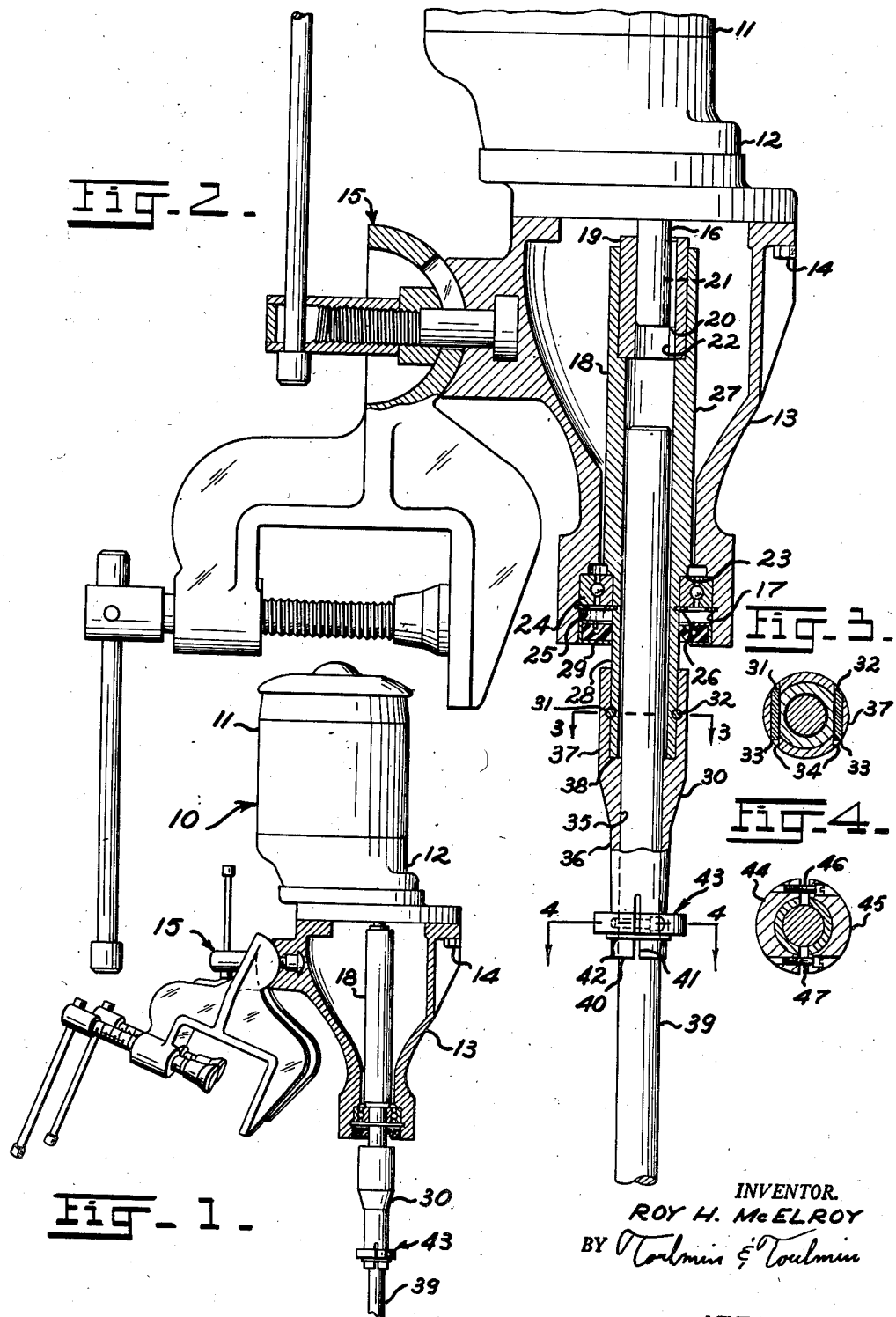

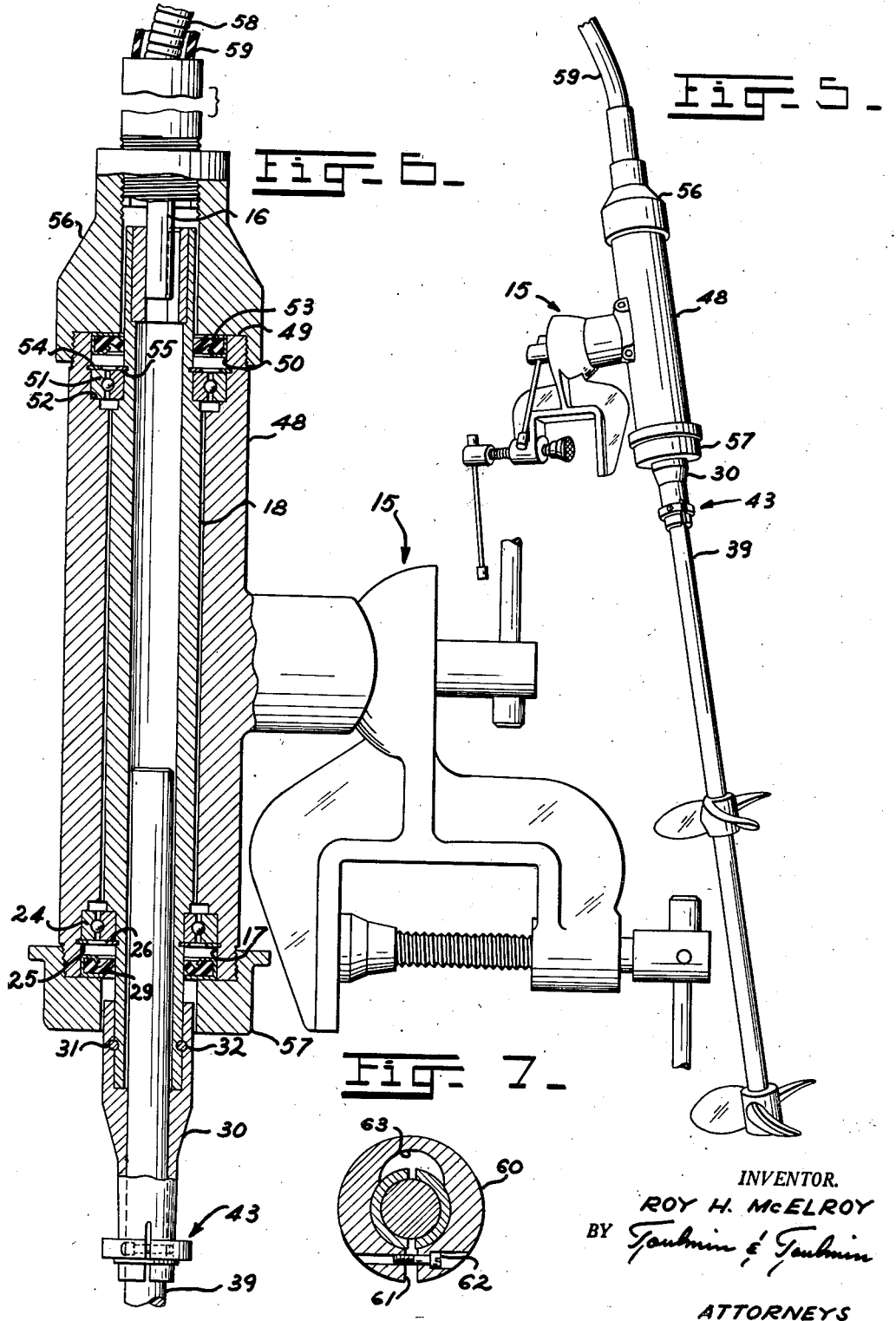

2,787,449

PORTABLE MIXER

Roy H. McElroy, Dayton, Ohio, assignor to International Engineering, Inc., Dayton, Ohio, a corporation of Ohio Application August 12, 1954, Serial No. 449,343

2 Claims. (Cl. 259—135)

The present invention relates to an adjustable shaft structure, more particularly to a mixing device having a shaft arrangement which is adapted to receive propeller shafts of varying diameters and wherein the length of the propeller shaft may be readily varied.

Portable mixing devices of the general type disclosed in this invention find many applications in various fields. One of the principal disadvantages of the conventional mixing device is that the mixing device is not readily adapted to change either the length or diameter of the propeller shaft. In the conventional mixing device when it is desired to change the diameter of the propeller shaft, it is usually necessary to dismantle the entire mixing device and then to insert the propeller shaft of the desired diameter. This operation of changing propeller shafts involves a considerable amount of time and during this time the mixing device is not in operation. Consequently, the changing of propeller shafts can be a costly operation to industry.

The conventional mixing device has some provision thereon for varying the length of the propeller shaft. This change in length of the propeller shaft may be accomplished in several different ways. It is extremely desirable, however, that in the interest of economy of operation the step of varying the length of the propeller shaft be simple enough so that it may be accomplished within a short period of time. While it is desired that the shaft structure be such as to enable the length of the shaft to be readily varied, the structure should also be such that there is no possibility of the propeller shaft becoming loose during operation of the mixing device. This means that the connecting structure which enables the length of the shaft to be varied must not only be simple in operation, but also be dependable in that it would rigidly retain the propeller shaft once an adjustment in length has been made.

It is further pointed out that this connecting structure should be such that there is no possibility of elements of the connecting structure shifting position so as to cause the propeller shaft to be in a state of unbalance. It can be readily appreciated that should the shaft become unbalanced during operation the mixing device itself may suffer damage.

The present invention discloses a shaft arrangement in a mixing device which eliminates the disadvantages enumerated above and incorporates the features which are desired in a mixing device which has a propeller shaft capable of being adjusted in length. The present invention essentially comprises a hollow shaft which is secured to a drive shaft extending from a gear box driven by a source of power. An adapter is secured to the free end of the hollow shaft and the adapter has a bore therein to closely receive the propeller shaft. Means are provided on the adapter to secure the propeller shaft in any desired position, and the length of the propeller shaft is determined by the amount of the propeller shaft which extends within the hollow shaft. With this structure if it is desired to use a propeller shaft of a different diameter, it is only necessary to insert an adapter which will accommodate the desired diameter propeller shaft upon the free end of the hollow shaft. In addition, the means used to secure the adapter to the hollow shaft and to secure the propeller shaft in position are extremely simple of operation and are so constructed that there is little likelihood of the propeller shaft becoming unbalanced.

It is, therefore, the principal object of this invention to provide an improved adjustable shaft arrangement.

It is another object of this invention to provide a mixing device wherein the length of the shaft may be readily adjusted.

It is a further object of this invention to provide a mixing device wherein various sizes of mixing shafts may be employed without the necessity of dismantling the entire mixing device when it is desired to change shafts.

It is a still further object of this invention to provide an improved adapter device for adjustably interconnecting a shaft to a hollow shaft.

It is still another object of this invention to provide an improved method of adjustably interconnecting a shaft to a hollow shaft.

Other objects and advantages of this invention will become apparent upon reference to the accompanying description when taken in conjunction with the following drawings wherein:

Fig. 1 is an elevation view of a mixing device incorporating this invention with a portion of the device cut away to show the manner in which the shaft is accommodated within the casing;

Fig. 2 is a vertical sectional view of the mixing device disclosed in Fig. 1 and enlarged to show the detail of the shaft construction;

Fig. 3 is a sectional view taken along the lines 3—3 of Fig. 2;

Fig. 4 is a sectional view taken along the lines 4—4 in Fig. 2;

Fig. 5 is a perspective view of a mixer for operation remote from a source of power and incorporating this invention;

Fig. 6 is a longitudinal sectional view of the casing of the mixer shown in Fig. 5; and Fig. 7 is a sectional view similar to Fig. 4 and showing a modified clamping device.

Returning now to the drawings, more particularly to Fig. 1 wherein like reference characters indicate the same parts throughout the various views, 10 indicates generally a mixing device incorporating the shaft arrangement disclosed as this invention. This mixing device 10 comprises an electric motor 11 of a suitable rating for the particular size of the mixing device. A gear box 12 may be secured to the electric motor 11 or may be made integral with the housing of the electric motor 11 as disclosed in Fig. 1. A bell shaped casing 13 secured by means of bolts 14 to the gear box 12. Clamp means indicated generally at 15 are attached to the bell shaped casing 13 in order to secure the mixing device to a suitable supporting member. It is to be understood that while vise-like clamp means are illustrated in this invention other suitable clamp means which are capable of adjustably positioning the mixing device may be readily used.

Proceeding now to Fig. 2, there is illustrated therein a drive shaft 16 which extends from the gear box 12. The drive shaft 16 is substantially along the central axis of the bell shaped casing 13 and there is an opening 17 at one end of the bell shaped casing which opening is axially aligned with the drive shaft 16. A hollow shaft 18 is positioned in overlapping relationship with the drive shaft 16. Suitable connecting means are provided to secure the hollow shaft to the drive shaft. These means may take the form of a cylindrical insert 19 which is fastened to the drive shaft 16 by means of a key 20 which snugly occupies cooperating grooves 21 and 22 which are located in the drive shaft 16 and the insert 19 respectively. The insert is then suitably fastened to the hollow shaft 18.

The hollow shaft 18 extends through the opening 17 and projects outwardly of the bell shaped casing 13. There is a shoulder 23 upon the hollow shaft 18 at the point where the hollow shaft passes through the opening 17. The shoulder 23 engages a suitable bearing 24 which is secured within the opening 17 by means of a retaining ring 25 which is fastened to the inner wall of the opening 17 and a retaining ring 26 which is secured to the outer surface of the hollow shaft 18. It can be seen that the shoulder 23 on the hollow shaft divides the shaft into a large diameter portion 27 and a smaller diameter portion 28. An oil seal 29 is secured within the opening 17 to prevent any bearing lubricant from leaking out of the bell shaped casing 13.

An adapter 30 is secured to the free end of the smaller diameter portion 28 of the hollow shaft 18. The adapter 30 may be secured to the hollow shaft 18 in any suitable manner. A preferable manner of securing the adapter is as illustrated in Figs. 2 and 3 which comprises the use of pins 31 and 32 which are snugly received within cooperating grooves 33 and 34 which are in the adapter 30 and smaller diameter shaft portion 28 respectively. The surface of the pins 31 and 32 is serrated or roughened in suitable manner so that the pins 31 and 32 will remain in position once the adapter 30 has been secured to the hollow shaft 18.

Proceeding to a description of the adapter 30 itself there is an axial bore 35 extending completely through the adapter 30. This bore has a smaller diameter portion 36 and a larger diameter portion 37, both of which are separated by means of a shoulder 38. By inserting the adapter 30 upon the smaller diameter portion 28 and the hollow shaft 18 until the end of the hollow shaft engages the shoulder 38, it can be seen that the grooves 33 and 34 will be aligned so that the pins 31 and 32 may be readily inserted within these grooves.

The smaller diameter portion 38 of the bore 35 is so dimensioned so as to closely receive a propeller shaft 39. At the smaller diameter end 40 of the adapter 30 there is a pair of diametrically opposed axial slots 41 which are cut completely through the wall of the adapter 30. A retaining ring 42 is firmly positioned over the axial slots 41 and is spaced from the smaller diameter end 40. The retaining ring 42 serves to hold in position a clamping device indicated generally at 43. The clamping device 43 comprises a pair of similarly shaped semi-annular members 44 and 45. A pair of diametrically opposed socket head screws 46 and 47 serve to maintain the semi-annular members 44 and 45 in assembled position. It can be seen that continued rotation of the screws 46 and 47 will serve to draw the semi-annular members 44 and 45 closer together and will consequently compress the slotted end of the adapter 30 to rigidly retain the propeller shaft 39 in position. As pointed out previously, the smaller bore portion 36 of the adapter 38 closely receives the propeller shaft 39. Consequently, when it is desired to use a propeller shaft of a particular diameter, it is only necessary that the adapter have a smaller internal diameter which corresponds to the outer diameter of the propeller shaft. Consequently, when it is desired to change propeller shafts, it is only necessary to remove the adapter 30 from the hollow shaft 18 by removing the pins 31 and 32. The proper size adapter is then readily secured upon the hollow shaft 18, the new propeller shaft inserted within the adapter, and the slotted end of the adapter compressed to retain the new propeller shaft in position. Thus it can be seen that since all of the adjusting structure is located outside of the mixing device itself there is no necessity whatsoever for dismantling the mixing device when it is desired to either lengthen the propeller shaft or to change propeller shafts.

The inner diameter of the hollow shaft 18 is made sufficiently large so as to accommodate propeller shafts up to a considerable diameter. By varying the amount of the propeller shaft which is received within the hollow shaft it is easily seen that the length of the propeller shaft may be varied throughout a considerable range. It is further pointed out that if it is desired to use a propeller shaft which is larger in diameter than the internal diameter of the hollow shaft, this may be easily done by securing an adapter having a proper internal diameter upon the free end of the hollow shaft. In this situation the propeller shaft will not be received within the hollow shaft but will abut the end of the hollow shaft. This arrangement will result in a shaft structure which is sufficiently rigid for most applications of the mixing device.

It should be borne in mind that this invention may be incorporated in mixers other than the type disclosed in Fig. 1. There is illustrated in Fig. 5 a mixer which is suitable for operation at a point remote from the source of power. This type of mixer may also be incorporated in the invention as has been described above. The portable mixer disclosed in Fig. 5 comprises a substantially cylindrical casing 48, which casing is open at both ends thereof. The motor end of the casing 48 has the opening 17 as described in connection with the mixer previously discussed. The bearing, retaining ring, and oil seal structure disposed within the opening 17 are similar to that as previously described.

At the other end 49, there is an opening 50 which opening has positioned therein a bearing 51 which engages a shoulder 52 on the hollow shaft 18. An oil seal 53 is employed to close the opening 50 and retaining rings 54 and 55 are used to position the bearing 51. The oil seal structure 53 is held in position by means of a cap 56 which may be threaded over the upper end 49 of the cylindrical casing. The lower oil seal 29 is similarly retained in position by means of a cap 57 which also may be threaded on the lower end of the casing 48.

The drive shaft 16 employed in the portable mixture illustrated in Figs. 5 and 6 is attached to a flexible shaft or coupling 58 instead of being attached to a gear train as in the structure employed in the mixer disclosed in Fig. 1. The flexible shaft 58 may be of any desired length appropriate for the conditions under which the mixer is to be employed and the flexible shaft is connected to a suitable source of power. In most cases this source of power will take the form of an electric motor, employing a gear reduction unit. It is preferable that the flexible shaft 58 be enclosed with a flexible tubular covering 59. This covering 59 serves to both protect the flexible shaft 58 and to retain a suitable lubricating medium in contact with the flexible shaft.

Thus it can be seen that the mixer unit illustrated in Figs. 5 and 6 is essentially the same as the previously described mixer but may be more easily handled than the mixer unit which has a built-in motor. However, all the benefits obtained from the shaft arrangement previously described are also obtainable from the presently described portable mixer unit.

In Fig. 7 there is illustrated a modified clamping device 60 for use on the smaller diameter end 40 of the adapter 30. The clamping device has an annular body with a gap 61 therein. A socket head screw 62 threadedly engages both sides of the gap whereby rotation of the screw 62 will draw the clamp 60 tighter about the adapter. There is a cutout portion 63 in the clamp opposite the gap 61 to enable the clamp 60 to be readily tightened.

As an alternative structure the adapter 30 may be modified by eliminating the retaining ring 42 and integrally forming an annular shoulder about the smaller diameter end 40. Either the retaining ring or the shoulder construction will readily position the clamping device employed over the slotted end of the adapter.

It is therefore seen that this invention provides a mixing device having an improved shaft arrangement in which the length of the shaft may be easily varied. In addition, this invention provides an improved shaft clamping device which is comparatively light and easily balanced as compared with the clamps in conventional use. Furthermore, the disclosure of an improved type of adapter enables various sized propeller shafts to be quickly installed without dismantling the entire mixing device and consequently disrupting the process in which the mixing device is employed.

It should be borne in mind that while this invention is described in connection with a portable mixing device, this new shaft arrangement is not at all limited to this particular field. This invention may be readily employed in other fields wherein it is necessary to connect a shaft to a hollow shaft and wherein it is desirable that the longitudinal relationship of these two shafts may be easily and quickly varied.

It will be understood that this invention is susceptible to modification in order to adapt it to different usages and conditions and, accordingly, it is desired to comprehend such modifications within this invention as may fall within the scope of the appended claims.

What is claimed as this invention is:

1. A mixing device comprising a drive motor, a gear box, a casing adjacent said gear box and having an opening, a hollow drive shaft driven by said motor and extending from said casing through said opening, a solid propeller shaft received within said hollow shaft and extending therethrough, an adapter detachably mounted on the end of said hollow shaft and having an axial bore therethrough with the ends of said bore being of different diameters, means detachably receiving the large diameter end of said adapter on said hollow shaft, there being axial slots in the smaller diameter end of said adapter, a retaining ring on said adapter adjacent said slotted end, and a removable clamping band on said adapter surrounding said axial slots and positioned by said retaining ring to compress said slotted end to rigidly support the solid propeller shaft within the adapter, said adapter being readily removable from said hollow shaft and replaceable by a similar adapter but having a different diameter in the smaller diameter end to enable a different diameter solid shaft to be supported in said adapter and extended from said hollow shaft without dismantling said mixing device.

2. A mixing device as claimed in claim 1, with said clamping band having a gap therein with screw means interconnecting the ends of the band separated by said gap for decreasing the diameter of said band to tighten the slotted end of said adapter.

References Cited in the file of this patent

UNITED STATES PATENTS

| | | |
|---|---|---|
| 1,557,923 | Carroll | Oct. 20, 1925 |
| 1,618,650 | Gilchrist | Feb. 22, 1927 |
| 1,817,353 | Craddock | Aug. 4, 1931 |
| 1,898,946 | Fitzgerald | Feb. 21, 1933 |
| 2,024,340 | Craddock | Dec. 17, 1935 |
| 2,376,722 | Podell | May 22, 1945 |
| 2,578,901 | Schmidt | Dec. 18, 1951 |

FOREIGN PATENTS

| | | |
|---|---|---|
| 23,652 | Great Britain | Oct. 15, 1909 |